United States Patent [19]

Holland et al.

[11] 3,726,004

[45] Apr. 10, 1973

[54] METHOD OF MAKING PRINTED CIRCUIT MAGNETIC FIELD COILS

[75] Inventors: Ernest Oliver Holland, Sandon; Leslie James Sadler, Chelmsford, both of England

[73] Assignee: The Marconi Company Limited, London, England

[22] Filed: Dec. 28, 1970

[21] Appl. No.: 101,854

[30] Foreign Application Priority Data

Mar. 20, 1970 Great Britain........................8,166/70

[52] U.S. Cl. .......................29/602, 29/625, 310/266, 336/200

[51] Int. Cl...............................................H01f 7/06

[58] Field of Search........................29/602, 598, 625; 310/266; 336/200; 335/213; 156/3, 6, 16

[56] References Cited

UNITED STATES PATENTS

| | | | |
|---|---|---|---|
| 2,830,212 | 4/1958 | Hanlet | 336/200 X |
| 3,623,220 | 11/1971 | Chase et al. | 29/598 |
| 2,831,136 | 4/1958 | Hanlet | 336/200 X |
| 3,007,087 | 10/1961 | Corpew | 335/213 |
| 3,587,019 | 6/1971 | Bull et al. | 335/213 X |

*Primary Examiner*—Charles W. Lanham
*Assistant Examiner*—Carl E. Hall
*Attorney*—Baldwin, Wight & Brown

[57] ABSTRACT

A printed circuit coil consisting of two portions to be made in cylindrical form is manufactured by joining the adjoining edges of the portions in the region of the end turns of the coil.

10 Claims, 4 Drawing Figures

INVENTORS
Ernest Oliver Holland
and
Leslie James Sadler
BY Baldwin Wight & Brown ATTORNEYS

METHOD OF MAKING PRINTED CIRCUIT MAGNETIC FIELD COILS

This invention relates to printed circuit magnetic field coils, that is to say, printed circuit coils for such purposes as generating the line and frame deflection fields of television camera and other cathode ray tubes and for other purposes in which accurate positioning of the turns of the coils is important. It is very difficult to obtain, by known methods, satisfactorily accurately positioned deflection coils on a television camera tube and especially so in the case of color television cameras in which, of course, precise color registration is necessary.

The invention is illustrated in and explained in connection with the accompanying drawings, in which FIGS. 1 and 2 illustrate present day known printed circuit camera tube deflection coils. These figures are provided in order to make clear the difference between such known coils and those of the present invention and the very substantial advantages which the present invention provides;

FIGS. 3 and 4 show diagrammatically by way of comparison a flat photomaster as used in the improved method of this invention for making printed circuit magnetic field coils.

Figure 1:
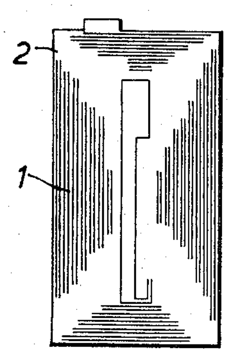
FIGS. 1 and 2 show diagrammatically a flat photomaster and a corresponding flat printed circuit coil as used in a known method of manufacturing printed circuit magnetic field coils.

The known photomaster in FIG. 1 consists of a coil pattern 1 printed on a rectangular flat transparent sheet 2. This photomaster is used to produce by a photo etching process a flat printed coil structure (shown in FIG. 2) which comprises, side by side, two rectangular copper coils 3 and 4 on a rectangular flat flexible plastic carrier member 5. This carrier member 5 is wrapped round the appropriate part of the television tube with which the coils are to be used so that said coils lie on a cylindrical surface with the side edges AA in FIG. 2 adjoining.

Figure 2:
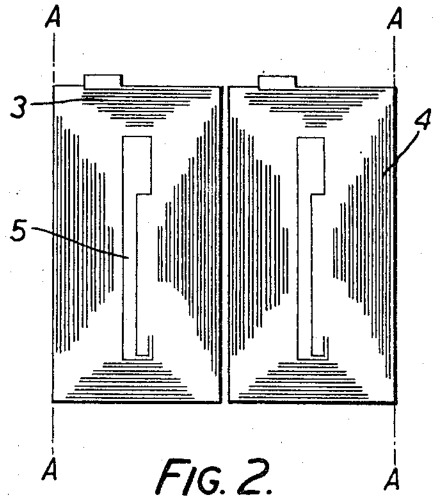

Known coils made as explained in connection with FIGS. 1 and 2 have the serious defect that very small and in commercial practice unavoidable inaccuracy in the dimensioning of the diameter of the cylindrical surface round which the structure of FIG. 2 is wrapped and very small inaccuracy of dimensioning of the carrier member 5 produce relatively large, and in some cases intolerably large inaccuracy of coil functioning. The attainment of accuracy of coil functioning is always important in a television camera, but in a color television camera, in which, of course, accurate registration is essential, quite small inaccuracies of coil functioning are intolerable because they prevent the obtaining of correct registration. In certain recently developed color cameras automatic registration is obtained by comparing signals derived during scanning by different tubes in the camera to correct for errors of registration between them. Such cameras form the subject of and are described in our copending British specification No. 37994/69. Our copending British specification No. 48168/69 is also directed to and describes color cameras in which automatic registration is obtained, the method of the invention in this specification being to utilize a special test card and employ signals obtained by different tubes when scanning across this card to correct for errors of registration. As will be seen from a study of these specifications, it is very important, in a color came a having automatic registration, that the deflection coils used for the different tubes shall function with the highest possible accuracy and even small departures from this will make the camera quite unsatisfactory. It is not putting the matter too strongly to state that known coils as described with reference to FIGS. 1 and 2 are most difficult to employ satisfactorily in color cameras and, in practice, almost impossible to employ satisfactorily in color cameras with automatic registration such as color cameras in accordance with the inventions in our above mentioned copending specifications.

The reason, which is not at first sight apparent, why coils as described in connection with FIGS. 1 and 2, are unsatisfactory or even intolerable in the cases just mentioned, will now be explained. When the structure of FIG. 2 is wrapped round the cylindrical surface which is to carry it, it is the edges AA which come together. If, therefore, the diameter of that surface is not precisely accurate and/or if the dimensioning of the carrier member 5 is not precisely accurate, the edges AA may overlap with consequent overlapping of the turns of the coils. The position where the edges AA adjoin is however in the middle of the magnetic field, that is to say in a position which is such that very small errors of placement of the coils will produce substantial non-uniformity of the magnetic field. It is therefore necessary if such non-uniformity of magnetic field is to be avoided, to manufacture the coil and the cylindrical surface with very high accuracy indeed and in commercial practice, such accuracy is hardly attainable at all to a degree sufficient to satisfy requirements in the case of a color camera with automatic registration.

The present invention seeks to overcome the foregoing defects and difficulties and to provide improved printed circuit magnetic field coils of the kind in which there are two coil portions which constitute the whole coil and lie on a cylindrical surface, but which are such as to be far less sensitive, in the matter of accuracy of functioning and uniformity of magnetic field, to small errors of dimensioning and placing than are known coils as described with reference to FIGS. 1 and 2. Printed circuit magnetic field coils in which there are two coil portions which constitute the whole coil and lie on a cylindrical surface will hereafter be referred to as coils of the kind referred to.

According to this invention, a method of manufacturing a printed circuit magnetic field coil of the kind referred to includes the step of so shaping and arranging the two portions of which said coil is constituted that, when said coil lies on the cylindrical surface whereon it is to be used the adjoining edges of said portions adjoin in the region of the end turns of the coil. Because these turns do not contribute materially to the magnetic field required for scanning, the defect above mentioned of known coils is avoided and small errors of dimensioning and placing are caused to be of little or negligible effect.

Preferably the coil is made direct upon a cylindrical former by a photo-etching process.

One method of manufacturing a printed circuit magnetic field coil in accordance with this invention includes the steps of coating a cylindrical insulating former with conductive material, coating the conductive material with a layer of light sensitive photo-resist, exposing the cylindrical former to light through a photomaster in accordance with the desired coil pattern and developing and etching the conductive material to produce the coil pattern.

Preferably, the method includes photographing a photomaster corresponding to one coil portion upon a photo-resist coating on a conductive layer on a cylindrical insulating former so that the photograph embraces substantially one half of the surface of the cylindrical insulating former on one side of its axis; similarly photographing said photo-master on the other half of the former and (by any method known per se) utilizing the photographs to produce a printed coil on the former.

Preferably, one half of the surface of the cylindrical insulating former is exposed to light for photographing whilst the other half is shielded from light, the cylindrical insulating former is then turned through 180° and the process repeated to produce a photograph on the other half of the surface of the cylindrical insulating former.

Preferably, the coil portions are rectangular and joining is effected in the region where the individual conductors forming the coil portions are perpendicular to the longitudinal axis of the cylindrical insulating former.

Any one of a number of materials is suitable for the cylindrical insulating former, preferred ones being glass, ceramic, synthetic resin bonded paper and fiber glass. The conductive layer is preferably copper.

Figure 3:
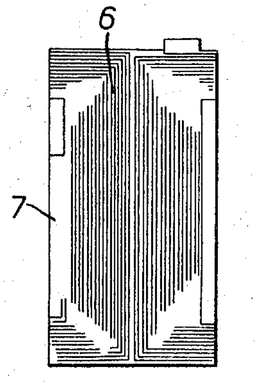
FIGS. 3 and 4 illustrate the present invention.
Figure 4:
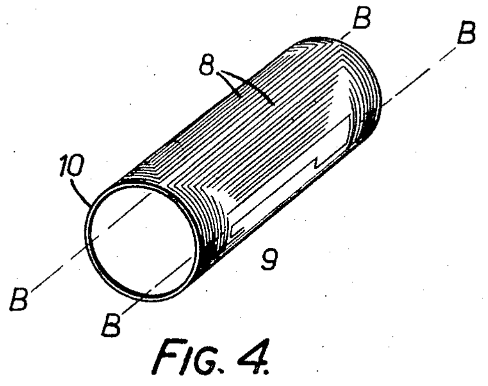

Referring to FIG. 3, this shows a flat photomaster consisting of a portion of a coil pattern 6 printed on a rectangular transparent member 7. This photomaster is used to photographically produce two portions of coil pattern 8 and 9 on a cylindrical glass former 10 as shown in FIG. 4. The glass former 10 is selected to be of the desired diameter and length, i.e. if for use with deflection coils for a camera tube arranged to slide over the camera tube body. During manufacture the glass former 10 is first coated with a layer of copper (not shown) and then with a layer of light sensitive photo-resist, (also not shown). A first coil pattern 8 is produced by subjecting one half of the surface of the former 10 to light through the photomaster whilst protecting the other half from light and a second coil pattern is produced by turning the former 10 through 180° and similarly subjecting the other half of the surface of the former to light through the photomaster so that the side edges BB adjoin. The coils are then developed and etched using well known techniques which do not require further description.

It will be seen that with an improved arrangement in accordance with this invention the join where the side edges BB adjoin occurs in the region of the end turns of the coil. Because these turns do not contribute materially to the magnetic field required for scanning, overlap of the edges of the photo-master images producing the coil pattern is unlikely to produce mismatched overlap of the turns since the turns of the coil are perpendicular to the lines BB and are therefore readily superimposed. Thus, undesirable non-uniformity of the magnetic field is very substantially reduced.

Furthermore, it should be noted that printed circuit magnetic field coils manufactured on the glass former are rigid, easily handled and more robust than those prepared on a flexible backing.

Another advantage of the invention is that the photographic process described gives accurate and predetermined coil positioning with the result that a high degree of uniformity between one deflection system and another is attained.

We claim:

1. A method of manufacturing a printed circuit magnetic field coil in two portions wherein each of said portions forms at least one half of said coil, said method comprising the steps of:

forming a first one of said portions on at least one circumferential half of a cylindrical surface on which said coil is to be used such that circumferentially extending conductor portions of the coil terminate at points spaced substantially longitudinally along the axis of said cylindrical surface and along lines substantially diametrically opposed on said surface; and forming a second one of said portions on the remaining half of the cylindrical surface such that circumferentially extending conductor portions of the second portion connect with corresponding ones of the first mentioned conductor portions along said substantially diametrically opposed lines on said surface.

2. A method as claimed in claim 8 wherein the coil is formed upon a cylindrical former by a photoetching process.

3. A method as claimed in claim 2 and which includes the steps of coating a cylindrical insulating former with conductive material, coating the conductive material with a layer of light sensitive photo-resist, exposing said layer to light through a photomaster in accordance with the desired coil pattern and developing said layer and etching the conductive material to produce the coil pattern.

4. A method as claimed in claim 3 and which includes photographing a photomaster corresponding to one coil portion upon a photo-resist coating on a conductive layer on a cylindrical insulating former so that the photograph embraces substantially one half of the surface of the cylindrical insulating former; similarly photographing said photomaster on the other half of the former and utilizing the photographs to produce a printed coil on the former.

5. A method as claimed in claim 4 wherein one half of the surface of the cylindrical insulating former is exposed to light for photographing whilst the other half is shielded from light, the cylindrical insulating former is then turned through 180° and the process repeated to produce a photograph on the other half of the surface of the cylindrical insulating former.

6. A method as claimed in claim 2 wherein the coil portions are rectangular and joining is effected in the region where the individual conductors forming the coil portions are perpendicular to the longitudinal axis of the cylindrical insulating former.

7. A method as claimed in claim 2 wherein the conductive layer is of copper.

8. The method of manufacturing a printed circuit magnetic field coil having an electrically conductive strip lying on a tubular surface and being continuous between its opposite ends to define the coil, said coil including a first portion defined by discontinuous sections of said coil and a second portion defined by other discontinuous sections of said coil, the discontinuous sections of said first portion having end portions terminating at points spaced longitudinally on the tubular surface in predetermined fashion and said end portions extending circumferentially in one direction on said tubular surface and the discontinuous sections of said second portion having end portions terminating at points spaced longitudinally on the tubular surface and extending circumferentially in the other direction on said tubular surface with the spacing of said points of the second portion corresponding with that of the first portion thereby allowing corresponding end portions of the two sections to join and define said coil, which comprises the steps of:

a. printing said first portion on an electrically conductive tubular surface within one circumferentially extending area thereof;
b. printing said second portion on said electrically conductive tubular surface within a circumferentially extending area thereof adjoining said first area with the end portions of the sections of the second portion aligned with and in electrical continuity with corresponding end portions of the sections of said first portion.

9. The method of manufacturing a tubular magnetic field coil assembly having a pair of circumferentially side-by-side coils of identical configuration and together occupying substantially the entire circumference of a tubular surface, each coil having parallel conductor portions at its opposite ends extending circumferentially of said tubular surface, which comprises the steps of:

a. forming on one-half of an electrically conductive tubular surface first portions of each said pair of coils, the first portion of one coil terminating along a first line passing through said parallel conductor portions of said one coil and the first portion of the other coil terminating along a second line passing through said parallel conductor portions of said other coil and diametrically opposed to said first line;
b. forming on the remaining half of said tubular surface said first portions of the two coils with the parallel conductor portions thereof aligned to connect with corresponding ones of the parallel conductor portions formed in step (a).

10. The method as defined in claim 9 wherein the forming of steps (a) and (b) is achieved by printing which printing is done with a common mask and including the steps of exposing said electrically conductive tubular surface through the mask to perform step (a) and then rotating said electrically conductive surface through an angle of 180° with respect to said mask to perform step (b).

* * * * *